(12) United States Patent
Brodigan

(10) Patent No.: US 6,198,745 B1
(45) Date of Patent: Mar. 6, 2001

(54) ATM BASED VDSL COMMUNICATION SYSTEM FOR PROVIDING VIDEO AND DATA ALARM SERVICES

(75) Inventor: Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/339,156

(22) Filed: Jun. 24, 1999

(51) Int. Cl.[7] ...................................... H04L 12/56
(52) U.S. Cl. .............................................. 370/395
(58) Field of Search ........................ 370/395, 230, 370/235, 397, 398, 399, 229, 231, 396, 237, 464, 465, 389; 379/93.15, 93.14, 100.13, 188, 189, 191, 198, 219, 220; 351/139, 118, 109, 113, 147

(56) References Cited

U.S. PATENT DOCUMENTS 6,044,079 * 3/2000 Calvignac et al. .................... 370/230
6,046,983 * 4/2000 Hasegawa et al. .................... 370/395

* cited by examiner

*Primary Examiner*—Dang Ton
(74) *Attorney, Agent, or Firm*—Brooks & Kushman P.C.

(57) ABSTRACT

An asynchronous transfer mode (ATM) based very-high-bit-rate digital subscriber line (VDSL) communication system for providing alarm services between an alarm service provider and a subscriber includes an ATM network connected to an alarm service provider. A host digital terminal is connected to the ATM network by an ATM permanent virtual circuit. The host digital terminal and the alarm service provider communicate alarm signals on the ATM permanent virtual circuit through the ATM network. A customer provided equipment (CPE) data device is connected through the optical network unit to the host digital terminal by a well known VDSL permanent virtual circuit. The well known VDSL permanent virtual circuit is supported on a fiber optics link between the host digital terminal and the optical network unit and a twisted pair link between the optical network unit and the CPE data device. The CPE data device and the host digital terminal communicate alarm signals on the well known VDSL permanent virtual circuit. A subscriber terminal unit is connected to the CPE data device for communicating alarm signals with the CPE data device. The host digital terminal connects the ATM permanent virtual circuit and the well known VDSL permanent virtual circuit to communicate the alarm signals between the alarm service provider and the subscriber terminal unit.

20 Claims, 2 Drawing Sheets

ATM BASED VDSL COMMUNICATION SYSTEM FOR PROVIDING VIDEO AND DATA ALARM SERVICES

TECHNICAL FIELD

The present invention relates generally to asynchronous transfer mode (ATM) based very-high-bit-rate digital subscriber line (VDSL) communications for providing video and data services and, more particularly, to an ATM based VDSL communication system for providing video and data alarm services between an alarm service provider and a subscriber.

BACKGROUND ART

Alarm service providers have provided alarm services to their customers using telephone dial systems, limited low speed data on metallic copper wire pair systems, low speed wireless systems, and dedicated line services. In general, these systems transmit data too slow, are too expensive, and require too many resources to satisfy the demand for providing alarm services to a greater mass of subscribers. Very-high-bit-rate subscriber line (VDSL) communication systems provide high speed video and data transmission between service providers and their subscribers at a relatively low cost with fewer resources needed per subscriber. For the foregoing reasons, there is a need for an ATM based VDSL communication system and associated method for providing video and data alarm services between an alarm service provider and a subscriber that overcome the limitations of the prior art.

SUMMARY OF THE INVENTION

Accordingly, it is an object of the present invention to provide an asynchronous transfer mode (ATM) based very-high-bit-rate digital subscriber line (VDSL) communication system for providing video and data alarm services between an alarm service provider and a subscriber.

It is another object of the present invention to provide an ATM based VDSL communication system in which video and data alarm services provided by an alarm service provider to a subscriber can be switched between data alarm services during normal conditions and video alarm services during alarm conditions.

It is a further object of the present invention to provide an ATM based VDSL communication system in which an alarm service provider can share the same twisted pair drop with another information provider to a subscriber.

In carrying out the above objects and other objects, the present invention provides an asynchronous transfer mode (ATM) based very-high-bit-rate digital subscriber line (VDSL) communication system for providing alarm services between an alarm service provider and a subscriber. The ATM based VDSL communication system includes an ATM network connected to an alarm service provider. A host digital terminal is connected to the ATM network by an ATM permanent virtual circuit. The ATM permanent virtual circuit is supported on a fiber optics link. The host digital terminal and the alarm service provider communicate alarm signals on the ATM permanent virtual circuit through the ATM network. An optical network unit is connected to the host digital terminal by a fiber optics link. A customer provided equipment (CPE) data device is connected through the optical network unit to the host digital terminal by a well known VDSL permanent virtual circuit. The well known VDSL permanent virtual circuit is supported on a fiber optics link between the host digital terminal and the optical network unit and a twisted pair link between the optical network unit and the CPE data device. The CPE data device and the host digital terminal communicate alarm signals on the well known VDSL permanent virtual circuit. A subscriber terminal unit is connected to the CPE data device for communicating alarm signals with the CPE data device. The host digital terminal connects the ATM permanent virtual circuit and the well known VDSL permanent virtual circuit to communicate the alarm signals between the alarm service provider and the subscriber terminal unit.

Preferably, the ATM permanent virtual circuit is selected by the host digital terminal from a plurality of ATM permanent virtual circuits for connection to the well known VDSL permanent virtual circuit. The host digital terminal switches between a first ATM permanent virtual circuit for communicating data alarm signals between the alarm service provider and the subscriber terminal unit and a second ATM permanent virtual circuit for communicating video alarm signals between the alarm service provider and the subscriber terminal unit. The host digital terminal switches between the first and second ATM permanent virtual circuits in response to an ATM permanent virtual circuit request data signal from the subscriber terminal unit.

Further, in carrying out the above objects and other objects, the present invention provides another ATM based VDSL communication system having an ATM network connected to an alarm service provider and an information service provider. A host digital terminal is connected to the ATM network by first and second ATM permanent virtual circuits. The first and second ATM permanent virtual circuits are supported on a fiber optics link. The host digital terminal and the alarm service provider communicate alarm signals on the first ATM permanent virtual circuit through the ATM network. The host digital terminal and the information service provider communicate information signals on the second ATM permanent virtual circuit through the ATM network. An optical network unit is connected to the host digital terminal by a fiber optics link. A customer provided equipment (CPE) data device is connected through the optical network unit to the host digital terminal by first and second well known VDSL permanent virtual circuits. The first and second well known VDSL permanent virtual circuits are supported on a fiber optics link between the host digital terminal and the optical network unit and a twisted pair link between the optical network unit and the CPE data device. The CPE data device and the host digital terminal communicate alarm signals on the first and second well known VDSL permanent virtual circuits. A subscriber alarm terminal unit is connected to the CPE data device by a first 10baseT port for communicating alarm signals with the CPE data device. A subscriber information terminal unit is connected to the CPE data device by a second 10baseT port for communicating information signals with the CPE data device. The host digital terminal connects the first ATM permanent virtual circuit and the first well known VDSL permanent virtual circuit to communicate the alarm signals between the alarm service provider and the subscriber alarm terminal unit and connects the second ATM permanent virtual circuit and the second well known VDSL permanent virtual circuit to communicate the information signals between the information service provider and the subscriber information terminal unit.

The above objects and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
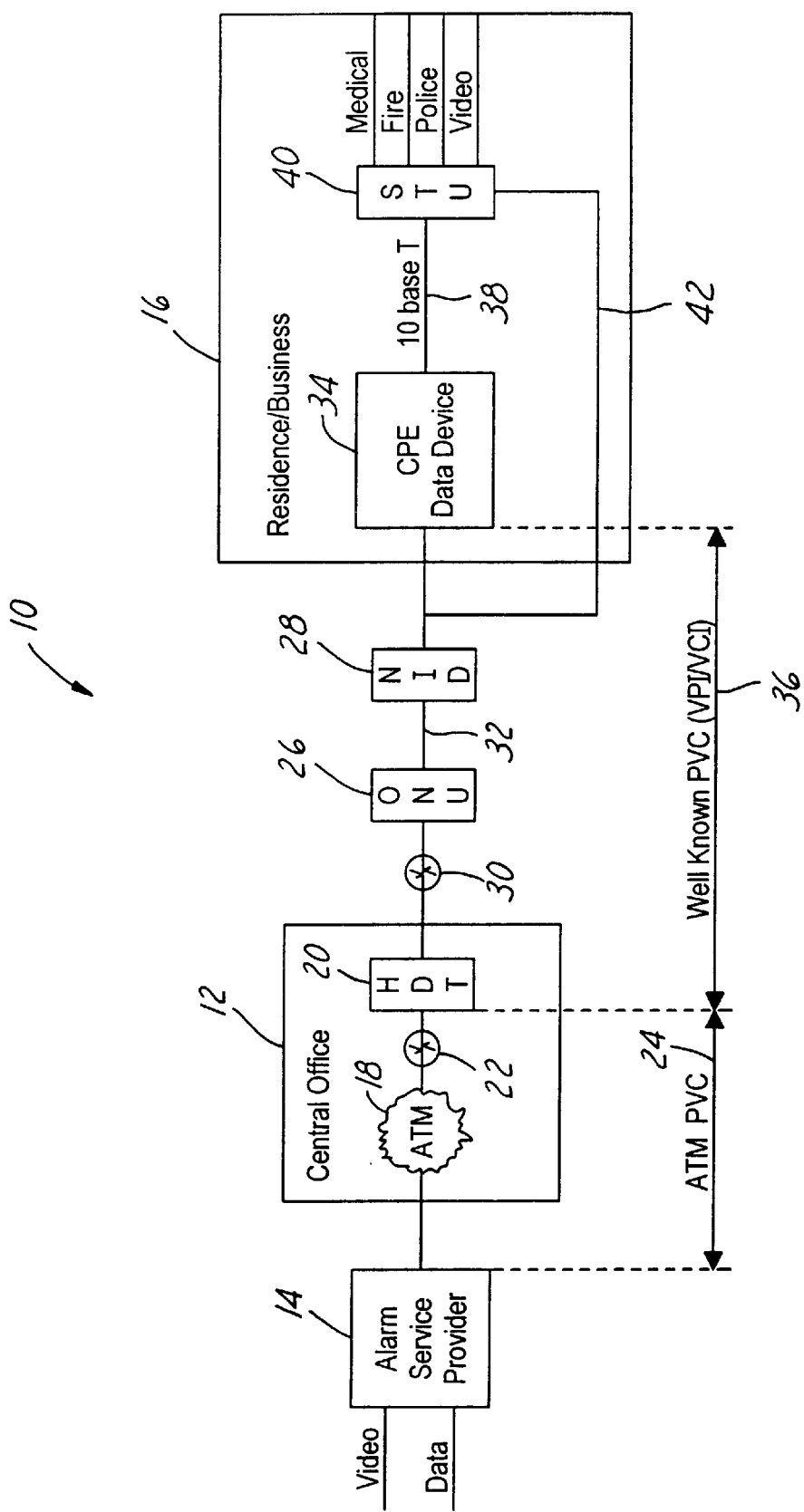
FIG. 1 illustrates an ATM based VDSL communication system in accordance with a preferred embodiment of the present invention.

Referring now to FIG. 1, an asynchronous transfer mode (ATM) based very-high-bit-rate digital subscriber line (VDSL) communication system 10 in accordance with a preferred embodiment of the present invention is shown. ATM is a high bandwidth, low-delay, connection-oriented, packet-like switching and multiplexing technique. ATM transmissions are cell-based, with cells having a fixed length. Information is presented to the network asynchronously. However, the switches and interlinking transmission facilities are synchronized. Of course, it is to be appreciated that the term "asynchronous transfer mode" as used herein is meant to encompass equivalent network architectures in addition to traditional ATM.

VDSL services are of particular interest for a hybrid local loop scenario. In particular, communication system 10 is suitable for fiber-to-the-neighborhood (FTTN), fiber-to-the-curb (FTTC), and fiber-to-the-home (FTTH) distribution. The various distribution formats are collectively referred to as FTTX. Communication system 10 provides a private line like connection between an alarm service provider and a subscriber so that the alarm service provider can provide video and data alarm services to the subscriber. The data alarm services include text type alarms. The video alarm services include still picture and motion video surveillance.

Communication system 10 includes a central office 12 connecting an alarm service provider 14 to a subscriber 16 such as a residence or business. Central office 12 includes an ATM network 18 and a host digital terminal (HDT) 20 connected together by a fiber optic link 22. Alarm service provider 14 includes an ATM switch (not specifically shown) for connecting to central office 12 via ATM network 18. Alarm service provider 14 transmits and receives data alarm signals to and from central office 12. Central office 12 transmits and receives these data alarm signals to and from subscriber 16. Similarly, alarm service provider 14 receives video alarm signals from the central office via ATM network 18. Central office 12 receives these video alarm signals from subscriber 16.

A soft ATM permanent virtual circuit 24 connects alarm service provider 14 to HDT 20 through ATM network 18. Alarm service provider 14 communicates with central office 12 through ATM PVC 24. HDT 20 selects ATM PVC 24 from a pool of available PVCs for alarm service provider 14 and the alarm service provider has its own service handle assigned to the ATM PVC termination at the HDT. A service handle identifies the data rates that the ATM PVC can handle. For instance, 256 Kbps or 1 Mbps. HDT 20 maintains the ATM parameters associated with ATM PVC 24. ATM PVC 24 can have various cell and bit rates such as constant bit rate (CBR), variable bit rate (VBR), available bit rate (ABR), and undefined bit rate (UBR) which are maintained in a database of HDT 20. Using ATM PVC 24 allows alarm service provider 14 to control its own service applications, Internet Protocol (IP) addresses, and security issues transparently to the VDSL network connecting subscriber 16 to HDT 20.

Central office 12 and subscriber 16 communicate using VDSL through an optical network unit (ONU) 26 and a network interface device (NID) 28. A fiber optics link 30 connects HDT 20 to ONU 26. HDT 20 can support typically up to sixty four ONUs. ONU 26 converts optical signals to electronic signals to communicate with NID 28 via a twisted pair drop 32. ONU 26 can support up to thirty two drops. NID 28 connects to a customer provided equipment (CPE) data device 34 of subscriber 16. HDT 20 of central office 12 and CPE data device 34 of subscriber 14 communicate though a well known PVC 36 having a virtual path identifier (VPI) and a virtual channel identifier (VCI). Well known PVC 36 is a digital subscriber line (DSL) for HDT 20 and CPE data device 34 to communicate using VDSL. Well known PVC 36 has sufficient bandwidth for supporting video and data communication. HDT 20 connects ATM PVC 24 with well known VDSL PVC 36 to establish a private line like connection between alarm service provider 14 and subscriber 16.

CPE data device 34 has a 10baseT port 38 for communicating with a subscriber terminal unit (STU) 40. STU 40 is connected to at least one of a various security monitors. The security monitors can be home security, medical, fire, police, or video monitors, etc. These monitors monitor the security conditions of the residence or business of subscriber 16. In response to the monitoring, STU 40 transmits video and data alarm signals from the security monitors to alarm service provider 14 through a system PVC consisting of ATM PVC 24 and well known VDSL PVC 36, i.e., the private line like connection between subscriber 16 and the alarm service provider. STU 40 receives data alarm signals from alarm service provider 14 for the security monitors through ATM PVC 24 and well known VDSL PVC 36. These data alarm signals from alarm service provider 14 enable the alarm service provider to control the security monitors via STU 40. STU 40 has its own IP address which is used by alarm service provider 14 for communicating with the STU.

Generally, alarm service provider 14 transmits data alarm signals to STU 40. In response, STU 40 polls the security monitors to determine if conditions are proper and, if so, then transmits a data acknowledgment signal back to the alarm service provider. These data signals require relatively low bandwidth and consume relatively low system resources. If an alarm condition presents itself, alarm service provider 14 and STU 40 can switch from communicating data alarm signals to communicating video alarm signals. Video alarm signals require relatively high bandwidth and consume more system resources. Switching between video and data alarm signals is accomplished by STU 40 transmitting a meta signaling data signal along well known VDSL PVC 36 to HDT 20. In response to the meta signaling data signal, HDT 20 provisions an ATM PVC for alarm service provider 14, i.e., ATM PVC 24, having sufficient bandwidth for communicating video alarm signals. HDT 20 then connects this ATM PVC with well known VDSL PVC 36 for establishing a private line like connection between alarm service provider 14 and subscriber 16. STU 40 then transmits video alarm signals to alarm service provider 14 along the private line like connection. Alarm service provider 14 can also control the switching between video and data alarm signals by instructing STU 40 to request a switch. In response to this request, STU 40 transmits the meta signaling data signal to HDT 20.

STU 40 may be connected to several video monitors or a monitor that can move. Alarm service provider 14 transmits control signals to STU 40 for controlling which monitor is to transmit video alarm signals to the alarm service provider. Alarm service provider 14 also transmits control signals to STU 40 for moving a movable monitor that is transmitting video signals to the alarm service provider.

Communication system 10 further includes a telephone line 42 connecting STU 40 to NID 28 while bypassing CPE data device 34. Telephone line 42 is a backup for enabling communication between alarm service provider 14 and STU 40 in the event of a power outage.

In operation, subscriber 16 wishes to subscribe with alarm service provider 14 to receive alarm services from the alarm service provider. In response, HDT 20 adds the service handle associated with alarm service provider 14 to the subscriber's user profile stored in the HDT. This service handle is added in the same manner as a video channel is added to a user video entitlement profile. After CPE data device 34 is powered on, HDT 20 establishes a connection between ATM PVC 24 and well known VDSL PVC 36 to connect alarm service provider 14 and subscriber 16 over a private line like connection, i.e., an established system PVC. Alarm service provider 14 assigns a unique IP address to STU 40. STU 40 then transmits a connect data signal over the established PVC to alarm service provider 14. If the established PVC between alarm service provider 14 and STU 40 is broken, the STU 40 continues to reestablish a connection to the alarm service provider 14 via telephone line 42. Alarm service provider 14 enables the video and data alarm services for STU 40 upon receiving the connect data signal from STU 40.

Alarm service provider 14 then transmits a polling data signal to STU 40 to ping the STU at predefined intervals. In response to receiving a polling data signal, STU 40 determines if an alarm condition is present. If an alarm condition is not present, STU 40 transmits an acknowledgment data signal back to alarm service provider 14 in response to the pinging. Failure to receive an acknowledgment signal causes alarm service provider 14 to generate an alarm condition. STU 40 can also detect the absence of pinging and generate an alarm condition. These polling and acknowledgment signals require relatively little bandwidth and, thus, ATM PVC 24 can be set at a low data rate such as 128 Kbps or 256 Kbps.

STU 40 also receives video signals from a video monitor and transmits these video signals to alarm service provider 14. The video signals are digital signals and may have different data rates depending upon whether still pictures, motion, or MPEG video is being transmitted. HDT 20 provisions an ATM PVC having sufficient bandwidth for handling the video signals. STU 40 may be connected to one of several monitors in which one monitor is transmitting video signals to the STU at a given time. Alarm service provider 14 can transmit control data signals to STU 40 to control which video monitor is transmitting video signals to the STU at a given time. Alarm service provider 14 then receives the video signals from the chosen video monitor via STU 40. This enables subscriber various locations to be monitored based on time or demand.

As indicated above, alarm service provider 14 and subscriber 16 can switch between communicating video and data alarm signals based on alarm conditions. Initially, host digital terminal 20 selects a first ATM PVC for connection to well known VDSL PVC 36 to communicate data alarm signals between alarm service provider 14 and subscriber 16. The first ATM PVC provides a sufficient bandwidth for the relatively low speed data alarm signals. In response to a request by STU 40, HDT 20 selects a different ATM PVC for connection to well known VDSL PVC 36 to communicate video alarm signals between alarm service provider 14 and subscriber 16. The second ATM PVC provides a sufficient bandwidth, for the relatively high speed video alarm signals.

Figure 2:
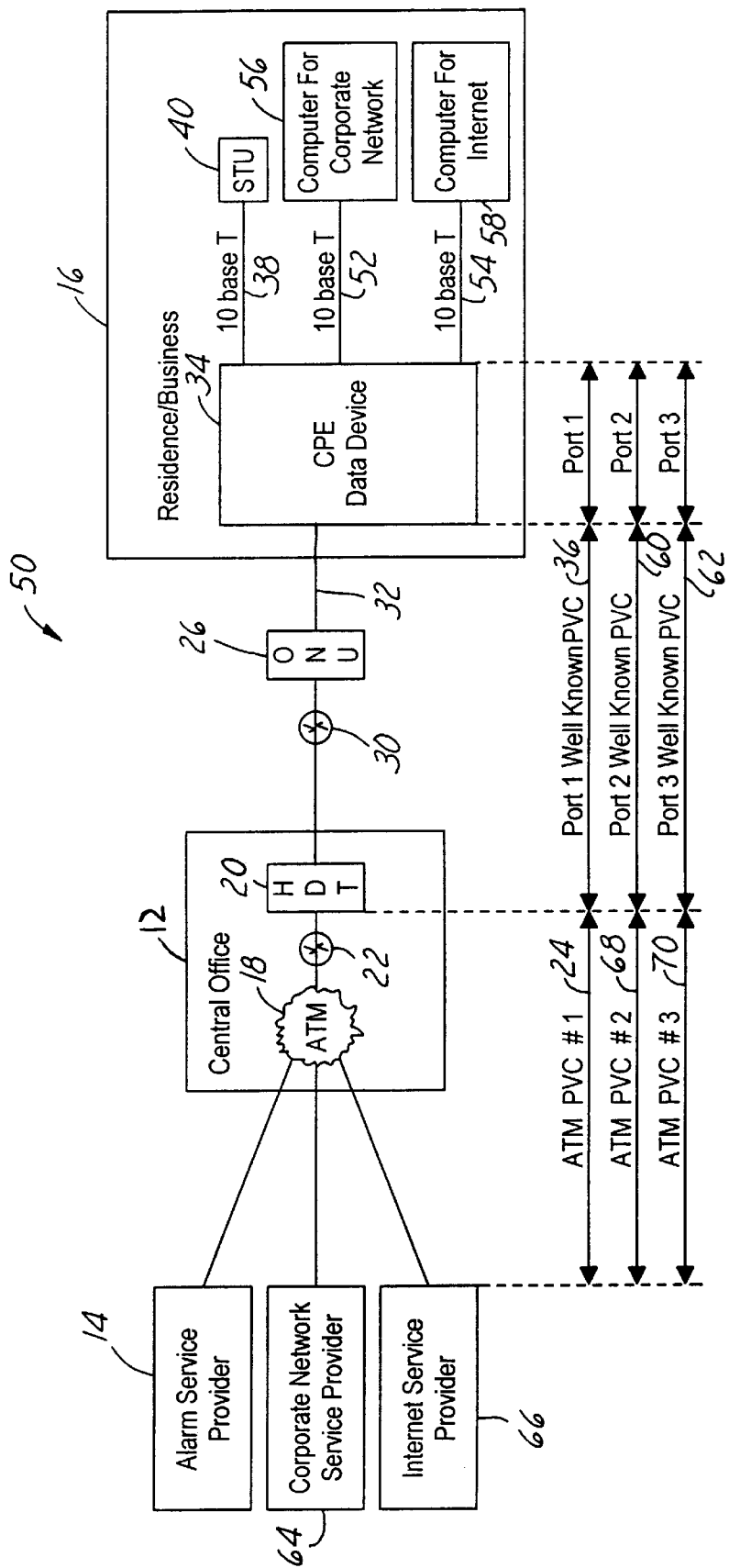
FIG. 2 illustrates an ATM based VDSL communication system in accordance an alternate embodiment of the present invention.

Referring now to FIG. 2, an ATM based VDSL communication system 50 in accordance with an alternate embodiment of the present invention is shown. Communication system 50 has many of the same elements as communication system 10 and like elements have the same reference numerals. Communication system 50 generally differs from communication system 10 in that CPE data device 34 supports multiple 10baseT ports 38, 52, and 54 for connection to multiple devices. Communication system 50 is configured so that each of the multiple devices communicate with a respective service provider connected to ATM network 18.

STU 40 is connected to CPE data device 34 by 10baseT port 38. STU 40 is also connected to a first device 56 such as a computer for a corporate network by 10baseT port 52 and a second device 58 such as a computer for the Internet by 10baseT port 54. Each 10baseT port 38, 52, and 54 has an associated well known VDSL PVC 36, 60, and 62, respectively, for connection to HDT 20 of central office 12. Alarm service provider 14 is connected to HDT 20 by ATM PVC 24. Similarly, a corporate network service provider 64 and an Internet service provider 66 are connected to HDT 20 by ATM PVC 68 and ATM PVC 70, respectively. HDT 20 connects ATM PVC 24 with well known VDSL PVC 36 for enabling alarm service provider 14 and STU 40 to communicate over a first private line like link, i.e., a first system PVC. HDT 20 connects ATM PVC 68 with well known VDSL PVC 60 for enabling corporate network service provider 64 and corporate computer 56 to communicate over a second private line like link, i.e., a second system PVC. HDT 20 connects ATM PVC 70 with well known VDSL PVC 62 for enabling Internet computer 58 and Internet service provider 66 to communicate over a third private line like link, i.e., a third system PVC. An advantage of communication system 50 is that three private line like links are established over a single twisted pair drop 32. This means that alarm service provider 14 shares the same physical drop with other information service providers such as Internet service provider 66, thereby making efficient use of system resources.

Thus, it is apparent that there has been provided, in accordance with the present invention, an ATM based VDSL communication system for providing video and data alarm services that fully satisfy the object, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An asynchronous transfer mode (ATM) based very-high-bitrate digital subscriber line (VDSL) communication system for providing alarm services between an alarm service provider and a subscriber, the ATM based VDSL communication system comprising:

an ATM network connected to the alarm service provider;

a host digital terminal connected to the ATM network by an ATM permanent virtual circuit, the ATM permanent virtual circuit being supported on a fiber optics link, the host digital terminal and the alarm service provider communicating alarm signals on the ATM permanent virtual circuit through the ATM network;

an optical network unit connected to the host digital terminal by the fiber optics link;

a customer provided equipment (CPE) data device connected through the optical network unit to the host digital terminal by a VDSL permanent virtual circuit, the VDSL permanent virtual circuit being supported on the fiber optics link between the host digital terminal and the optical network unit and a twisted pair link between the optical network unit and the CPE data device, the CPE data device and the host digital terminal communicating the alarm signals on the VDSL permanent virtual circuit; and a subscriber terminal unit connected to the CPE data device for communicating the alarm signals with the CPE data device;

wherein the host digital terminal connects the ATM permanent virtual circuit and the VDSL permanent virtual circuit to communicate the alarm signals between the alarm service provider and the subscriber terminal unit.

2. The ATM based VDSL communication system of claim 1 wherein:

the alarm signals include data signals.

3. The ATM based VDSL communication system of claim 2 wherein:

the alarm service provider transmits a polling data signal to the subscriber terminal unit and the alarm service provider detects an alarm condition if the subscriber terminal unit fails to transmit an acknowledgment data signal to the alarm service provider in response to the polling data signal.

4. The ATM based VDSL communication system of claim 3 wherein:

the subscriber terminal unit transmits an acknowledgment data signal to the alarm service provider in response to a polling data signal if an alarm condition is not present.

5. The ATM based VDSL communication system of claim 1 wherein:

the alarm signals include video signals.

6. The ATM based VDSL communication system of claim 5 wherein:

the subscriber terminal unit transmits video signals to the alarm service provider.

7. The ATM based VDSL communication system of claim 1 wherein:

wherein the ATM permanent virtual circuit is selected by the host digital terminal from a plurality of ATM permanent virtual circuits for connection to the VDSL permanent virtual circuit, wherein the host digital terminal switches between a first ATM permanent virtual circuit for communicating data alarm signals between the alarm service provider and the subscriber terminal unit and a second ATM permanent virtual circuit for communicating video alarm signals between the alarm service provider and the subscriber terminal unit.

8. The ATM based VDSL communication system of claim 7 wherein:

the host digital terminal switches between the first and second ATM permanent virtual circuits in response to a meta signaling data signal from the subscriber terminal unit.

9. The ATM based VDSL communication system of claim 1 wherein:

a 10baseT port connects the CPE data device and the subscriber terminal unit.

10. An asynchronous transfer mode (ATM) based very-high-bit-rate digital subscriber line (VDSL) communication system for providing alarm services between an alarm service provider and a subscriber, the ATM based VDSL communication system comprising:

an ATM network connected to the alarm service provider;

a host digital terminal connected to the ATM network by an ATM permanent virtual circuit, the ATM permanent virtual circuit being supported on a fiber optics link, the host digital terminal and the alarm service provider communicating alarm signals on the ATM permanent virtual circuit through the ATM network;

an optical network unit connected to the host digital terminal by the fiber optics link;

a customer provided equipment (CPE) data device connected through the optical network unit to the host digital terminal by a VDSL permanent virtual circuit, the VDSL permanent virtual circuit being supported on the fiber optics link between the host digital terminal and the optical network unit and a twisted pair link between the optical network unit and the CPE data device, the CPE data device and the host digital terminal communicating the alarm signals on the VDSL permanent virtual circuit; and a subscriber terminal unit connected to the CPE data device for communicating the alarm signals with the CPE data device;

wherein the host digital terminal connects the ATM permanent virtual circuit and the VDSL permanent virtual circuit to communicate the alarm signals between the alarm service provider and the subscriber terminal unit, wherein the ATM permanent virtual circuit is selected by the host digital terminal from a plurality of ATM permanent virtual circuits for connection to the VDSL permanent virtual circuit, wherein the host digital terminal switches between a first ATM permanent virtual circuit for communicating data alarm signals between the alarm service provider and the subscriber terminal unit and a second ATM permanent virtual circuit for communicating video alarm signals between the alarm service provider and the subscriber terminal unit.

11. The ATM based VDSL communication system of claim 10 wherein:

the host digital terminal switches between the first and second ATM permanent virtual circuits in response to a meta signaling data signal from the subscriber terminal unit.

12. An asynchronous transfer mode (ATM) based very-high-bit-rate digital subscriber line (VDSL) communication system for providing alarm services between an alarm service provider and a subscriber, the ATM based VDSL communication system comprising:

an ATM network connected to the alarm service provider and an information service provider;

a host digital terminal connected to the ATM network by first and second ATM permanent virtual circuits, the first and second ATM permanent virtual circuits being supported on a fiber optics link, the host digital terminal and the alarm service provider communicating alarm signals on the first ATM permanent virtual circuit through the ATM network, the host digital terminal and the information service provider communicating information signals on the second ATM permanent virtual circuit through the ATM network;

an optical network unit connected to the host digital terminal by the fiber optics link;

a customer provided equipment (CPE) data device connected through the optical network unit to the host digital terminal by first and second VDSL permanent virtual circuits, the first and second VDSL permanent virtual circuits being supported on the fiber optics link between the host digital terminal and the optical network unit and a twisted pair link between the optical network unit and the CPE data device, the CPE data device and the host digital terminal communicating the alarm signals on the first and second VDSL permanent virtual circuits;

a subscriber alarm terminal unit connected to the CPE data device by a first 10baseT port for communicating the alarm signals with the CPE data device; and a subscriber information terminal unit connected to the CPE data device by a second 10baseT port for communicating the information signals with the CPE data device;

wherein the host digital terminal connects the first ATM permanent virtual circuit and the first VDSL permanent virtual circuit to communicate the alarm signals between the alarm service provider and the subscriber alarm terminal unit and connects the second ATM permanent virtual circuit and the second VDSL permanent virtual circuit to communicate the information signals between the information service provider and the subscriber information terminal unit.

13. The ATM based VDSL communication system of claim 12 wherein:

the alarm signals include data signals.

14. The ATM based VDSL communication system of claim 13 wherein:

the alarm service provider transmits a polling data signal to the subscriber alarm terminal unit and the alarm service provider detects an alarm condition if the subscriber alarm terminal unit fails to transmit an acknowledgment data signal to the alarm service provider in response to the polling data signal.

15. The ATM based VDSL communication system of claim 14 wherein:

the subscriber alarm terminal unit transmits an acknowledgment data signal to the alarm service provider in response to a polling data signal if an alarm condition is not present.

16. The ATM based VDSL communication system of claim 12 wherein:

the alarm signal include video signals.

17. The ATM based VDSL communication system of claim 16 wherein:

the subscriber alarm terminal unit transmits video signals to the alarm service provider.

18. The ATM based VDSL communication system of claim 12 wherein:

wherein the first ATM permanent virtual circuit is selected by the host digital terminal from a pool of ATM permanent virtual circuits associated with the alarm service provider for connection to the first VDSL permanent virtual circuit, wherein the host digital terminal switches between a first ATM permanent virtual circuit in the pool for communicating data alarm signals between the alarm service provider and the subscriber alarm terminal unit and a second ATM permanent virtual circuit in the pool for communicating video alarm signals between the alarm service provider and the subscriber alarm terminal unit.

19. The ATM based VDSL communication system of claim 18 wherein:

the host digital terminal switches between the first and second ATM permanent virtual circuits in the pool in response to a meta signaling data signal from the subscriber terminal unit.

20. The ATM based VDSL communication system of claim 12 further comprising:

a telephone line connecting the subscriber alarm terminal unit to the twisted pair link for providing a link to the central office in case the CPE data device is powered off.

* * * * *